Aug. 18, 1964 H. R. JENSEN 3,145,366
COMPARING MATRIX
Filed June 30, 1961

INVENTOR
HOLGER R. JENSEN
BY Leo J. Aubel
ATTORNEY

United States Patent Office 3,145,366
Patented Aug. 18, 1964

3,145,366

COMPARING MATRIX

Holger R. Jensen, Endicott, N.Y., assignor to International Business Machines Corporation, New York, N.Y., a corporation of New York Filed June 30, 1961, Ser. No. 121,025
7 Claims. (Cl. 340—146.2)

This invention relates to a comparing matrix and, more particularly, to a matrix arranged to receive inputs and to determine the relative values of said inputs.

In computer technology, it is often necessary to receive inputs and to compare the inputs to provide an indication of the relative values of said inputs in order to provide control functions such as for branching operations, and for table look-up operations. For example, if in one instance one input is of a larger value than a second input; the control function is arranged to select or set up circuits in a particular path; if the first input is of a value lower than or equal to the second input, a second path may be selected.

Accordingly, it is a principal object of the present invention to provide a comparing matrix arranged to receive inputs and to provide an indication of the relative values of said inputs.

It is another object of the invention to provide a comparing matrix utilizing magnetic cores as the logic elements.

It is yet another object of the invention to provide an improved magnetic core matrix which is inexpensive and which is efficient in operation.

It is yet another object of the present invention to provide a comparing matrix utilizing magnetic cores as logic elements arranged to receive two inputs to provide an output indicative of whether the first input is of a higher relative value than the second input, whether the two inputs are equal, or whether the second input is of a higher value than the first input.

In the attainment of the foregoing objects, I provide a matrix comprising a plurality of logical elements or devices in the form of magnetic cores arranged to receive inputs from a code translator in a one-out-of-$n$ code, means are provided for connecting control current pulses to the cores in the matrix in a predetermined manner. The inputs to be compared are introduced to the matrix serially and in a time relation with control pulses of a distinct pattern. The inputs are coupled to respective core windings such that the higher value input is coupled to a core in one extreme end of the matrix and the cores in the succeeding positions have progressively lower inputs coupled to their associated windings. The core windings are arranged such that the inputs are processed and combined with the control pulses to provide outputs in a time relation which indicates the relative value of the inputs.

The foregoing and other objects, features and advantages of the invention will be apparent from the following more particular description of a preferred embodiment of the invention, as illustrated in the accompanying drawings.

Figure 1:
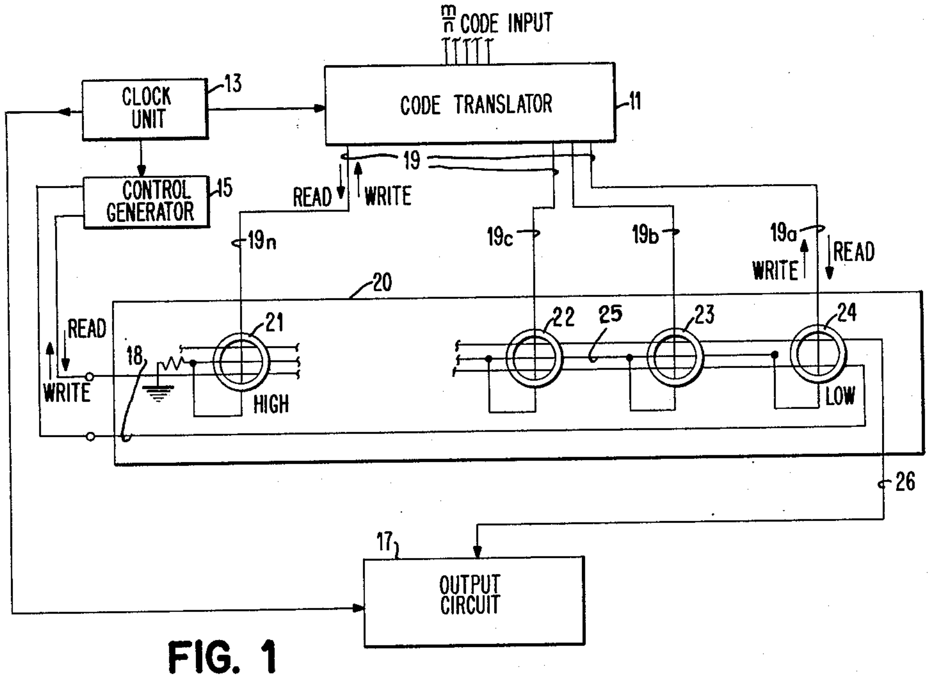
FIG. 1 shows a diagram of a compare matrix in accordance with the invention; associated circuitry is shown in block form.

Referring to FIG. 1, an $m$-out-of-$n$ code is coupled to a code translator 11. Translator 11 converts the $m$-out-of-$n$ code into a 1-out-of-$n$ code such as, for example, a numeric or alpha-numeric code. Lines or leads collectively designated as 19 couple translator 11 to a compare matrix 20.

The compare or comparing matrix 20 comprises a plurality of bistable magnetic cores 21–24 of any suitable type known in the art. In the embodiment shown in FIG. 1, the lines 19 are arranged such that the higher valued one of the numeric or alpha-numeric code inputs appears on the line coupled to a core in the extreme left-hand end of the matrix and the lines associated with the cores in succeeding positions from said extreme end have progressively lower valued inputs coupled thereto. For example, if the output code is in a numeric code, the higher value factor input, that is, the number 9, would appear on line 19$n$, the succeedingly lower valued inputs would appear on the lines associated with succeedingly positioned cores, and a zero would appear on line 19$a$. It will be understood that the values of the respective character coupled to the various cores may be varied by interchanging the connections between the translator 11 and the cores in matrix 20.

Code translator 11, which may be of the type disclosed in application S.N. 859,293 of M. L. Rauhe (assigned to the same assignee as the present invention, now abandoned) provides a current pulse in one direction when it is set and a current pulse in a negative direction when it is Reset thus providing bidirectional pulsed current flow through the lines 19. Current flow in one direction is arbitrarily indicated as a Read current and current flow in the opposite direction is indicated as a Write current; likewise the current pulses provided by a control pulse generator 15 through a common control line 18 to all the cores in matrix 20 are arbitrarily indicated as Read and Write pulses.

Each of the input lines 19 is wound through a respective first core in one direction to tend to shift said respective core to one magnetic state in response to current flow in one direction and each line then connects to a common line 25 which is wound through cores 19$b$, 19$c$ . . . 19$n$ in a direction to tend to shift said higher valued cores in the relatively opposite direction. For example, at the time current is flowing through line 19$a$ in a Read direction, core 24 in matrix 20 will tend to be shifted to one stable state, that is, Set; however, this same current flowing through line 25 will tend to cause the other cores in the matrix, namely 21, 22 and 23, to be shifted to the other stable state, that is, Reset, because of the relatively opposite direction in which line 19$a$ is wound on cores 21, 22 and 23.

The clock unit 13 which may be of any suitable known type provides timing pulses to the other units in the system, namely, to the code translator 11, the control pulse generator 15, and the output circuits 17. The timing periods are of equal lengths. A full operating cycle of the system comprises 5 time segments or periods, namely, T1, T2, T3, T4 and T5, as shown in FIG. 2.

Figure 2:
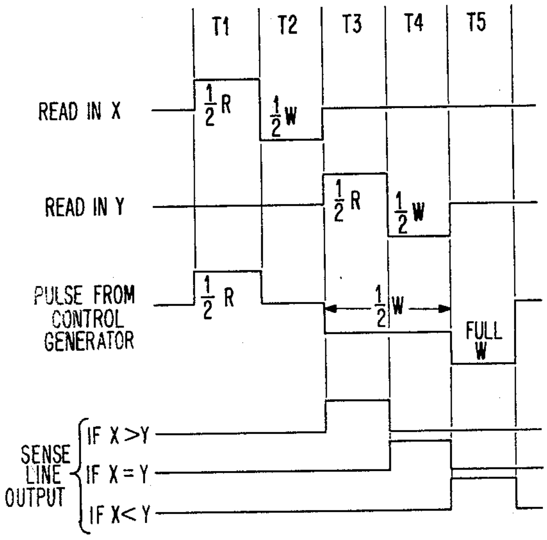
FIG. 2 shows timing graphs useful in explaining the operation of the circuit in accordance with the present invention.

In FIG. 2, a read current R is arbitrarily shown to be a positive pulse and a write current W is arbitrarily shown to be a negative pulse. As is conventional, a core requires a full select current to shift its magnetic state, the symbol ½R or ½W indicates that a current pulse of one-half select amplitude is provided to a line at a particular time period. The code translator 11 provides one-half select read current ½R, that is, current flowing in one direction during one time period, and a one-half write current ½W, that is, current flowing in the relatively opposite direction through the same line during a succeeding time period to indicate a given factor.

The control pulse generator 15 is controlled by clock unit 13 to provide a particular pattern of output pulses, as shown in FIG. 2. More particular, control pulse generator 15 provides a one-half select read current ½R during a first time period T1, a zero current or neutral pulse during a second time period T2, a one-half write current ½W during third and fourth time periods T3 and T4 and a full write current during a fifth time period T5.

To synchronize the output of the circuit to provide an intelligible output, clock unit 13 also provides timing pulses to the output circuit 17.

Figure 3:
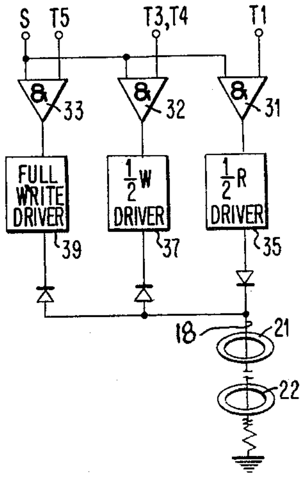
FIG. 3 shows a control generator for the system of FIG. 1 in somewhat more detail.

Although control generator 15 can be of any suitable type known in the art, one circuit for obtaining the pattern of pulses, as indicated in FIG. 2, is shown in FIG. 3. For example, an initiating, read-in or activating signal S from suitable activating circuits in an associated computer, not shown, for energizing control generator 15 is coupled in parallel to AND circuits 31, 32 and 33. An input T1 from the clock unit 13 is coupled to AND circuit 31, a second input T3 and T4 is coupled to AND circuit 32, and a third input T5 is coupled to AND circuit 33. The outputs of the AND circuits are connected to drivers 35, 37 and 39. Driver 35 provides a ½R current, that is, current flowing in one direction; driver 37 provides a ½W current, that is, current flowing in an opposite direction; and, driver 39 provides a full write current.

The operation of the circuit can be readily appreciated from FIG. 3. Coincidence of signals S and T1 will activate driver 35 during time T1, coincidence of signals S and T3, and S and T4 will activate driver 37 during times T3 and T4 respectively, coincidence of signals S and T5 will activate driver 39 at time T5. The diodes are included in the circuit to prevent back current paths.

The operation of the circuit of FIG. 1 is as follows. Assume that all the cores are in the initial or Reset state. Assume that at time interval T1 (see FIG. 2), clock unit 13 activates code translator 11 to read out a first factor X which has the value such that line **19*b* is energized to provide a one-half select read current ½R to core 23. At time T1, clock unit 13 also activates control generator 15 to provide a ½R current through line 18 to all the cores in the matrix 20. The ½R current in line 19*b* and the ½R current in line 18 combine to provide a Full Read current to shift core 23** to its Set state. All the other cores remain in their Reset condition.

At time T2, clock unit 13 activates code translator 11 to provide a one-half select write current ½W through line **19*b* to core 23. As indicated above, the currents are designated as read or write to indicate the different directions of the current flow through the respective lines. At time T2, clock unit 13 also activates the control generator 15 to provide a neutral, that is, no pulse through line 18 to the cores of matrix 20. The ½W current through line 19*b* is insufficient to change the state of, that is, Reset core 23**.

At time T3, clock unit 13 activates code translator 11 to read out a second factor Y through a respective line 19 to one of the cores in matrix 20. Assume that the second factor Y is of a lesser value than factor X. The code translator will therefore energize line **19*a* by a ½R current to tend to shift core 24 to a Set state. At time T3, clock unit 13 activates control generator 15 to provide a ½W current through line 18 to the cores in the matrix. As concerns core 24, the current through line 19*a* is in an effectively opposite direction with respect to the current from line 18; core 24 will therefore not be Set but will remain in its initial state. As noted above, line 19*a* is wound in a direction to tend to shift core 24 to a Set state in response to current flow in a first direction and is wound in the opposite direction through the higher valued cores to tend to shift the higher valued cores to the opposite Reset magnetic state due to current flow in said first direction. The ½R current flowing in line 25 will cause cores 23, 22 and 21 to tend to be Reset. The cores 21 and 22 will not be affected by the current flowing through lines 18 and 19*a* since these cores are still in a Reset state; however, the ½W current coupled from control generator 15 through line 18 to the cores in the matrix will combine with current flowing through line 19*a* to shift core 23 to a Reset state. Core 23 will provide an output through sense line 26 to the output circuit 17 when it is Reset. The output circuit 17 also receives a synchronizing timing signal from clock unit 13** to provide an output during the time period T3.

During time T4, clock unit 13 will activate code translator 11 to provide a ½W current pulse through line **19*a* to core 24. Since core 24 already in a Reset state, the ½W current coupled by line 19*a* to core 24 and the ½W current coupled by line 18 to core 24 during time T4 will not cause any shift in the stable state of core 24. Cores 21, 22 and 23 remain in a Reset state since, as concerns these cores, the current flowing in line 25 opposes the current flowing in line 18**.

Assuming next that the factor X is equal to the factor Y. At times T1 and T2, the operation of the circuit is as before to set core 23. At time T3, clock unit 13 will activate code translator 11 to provide an output, and since the factors X and Y are equal, the same line, that is, line **19*b*, will be energized by a ½R current. At time T3, a ½W current is also coupled from control generator 15 through line 18 to all the cores in matrix 20. At this point, all the cores, with the exception of core 23, are in a Reset state so that the current will tend to reset only core 23. However, the ½R current flowing at this time through line 19*b* opposes the effect of the ½W current flowing through line 18, and core 23 will remain in its Set state. Note that the current flowing in line 25 will combine with the ½W current in line 18 to provide a Full Write current to Reset cores 21 and 22, but since these cores are already in a Reset state, there is no signal developed in sense line 26**.

At time T4, clock unit 13 will activate code translator 11 to provide a ½W current pulse through line **19*b* to core 23. At the same time, control generator 15 is providing a ½W pulse through line 18 to the cores in the matrix. The ½W current from line 19*b* and the ½W current from line 18 will cause core 23 to shift to a Reset magnetic state and thus develop an output on sense line 26 to output circuits 17. The current flowing in line 25 opposes the ½W current in line 18; thus cores 21 and 22 are not affected. Core 24 remains in a Reset state. Clock unit 13 provides a timing pulse to output circuit 17** to indicate an output during time T4.

Finally, assume that the factor Y is of a higher value than the factor X. At times T1 and T2, the operation of the circuit is as before to set core 23. At time T3, clock unit 13 will activate code translator 11 to provide a ½R current through a line coupled to a higher valued core, say, line **19*n*, to core 21. Also, at time T3, clock generator 15 provides a ½W pulse through line 18 to the cores in matrix 20. The current through lines 18 and 19*n* will, in effect, buck or cancel each other and will not cause core 21 to shift magnetic states. At times T4, code translator 11 provides a ½W pulse through line 19*n* to core 21. At the same time, control generator 15 provides a ½W current through line 18 to core 21. However, since core 21 is already in a Reset state, the full select write current flowing through its windings 18 and 19*n* will not cause the core to change magnetic states. Core 23 which has been Set by the current corresponding to factor X will not be switched by the ½W current flowing through line 18**.

At time T5, clock unit 13 activates control generator 15 to provide a full select write current through line 18 to Reset all the cores in the matrix. Core 23 which has been driven to a Set state by current corresponding to factor X will be Reset by this full write current from control generator 15 to develop an output which is coupled by sense line 26 to the output circuits 15. Clock unit 13 provides timing pulses to output circuit 17 to synchronize or indicate that the output is obtained during time T5.

The foregoing system may be modified to yield its compare result at one time, rather than sequentially, by adding two more matrices similar to matrix 20 to the system. Alternatively, only two matrices may be used and a compare logic operation may be performed at the outputs of the matrices.

While the invention has been particularly shown and described with reference to a preferred embodiment thereof, it will be understood by those skilled in the art that various changes in form and details may be made therein without departing from the spirit and scope of the invention.

What is claimed is:

1. A comparing matrix comprising, in combination, a plurality of bistable devices, first means for coupling input pulses representative of the factors to be compared to respective devices, each factor of a particular value being coupled to a respective device, each said factor input arranged to cause the device to which it is coupled to tend to shift stable states, second means for providing control pulses to said devices, said control pulses being variable in amplitude and polarity in time dependence, and said first and second means combining the factor input pulses and the control pulses to shift the state of one of said devices, for developing output pulses in time dependence representative of the relative values of said factors.

2. A matrix as in claim 1 in which said devices are magnetic cores having current carrying lines wound therethrough, said cores changing magnetic states in response to a full select current flowing through their associated lines.

3. A matrix as in claim 2 in which said input pulses are of a half-select positive and of a half-select negative amplitude; said control pulses are of a half-select positive, a half-select negative amplitude, and a full select negative amplitude; and said input pulses and said control pulses vary in time dependence.

4. A comparing matrix for comparing two factors comprising, in combination, a plurality of bistable magnetic cores, means for coupling input bilateral current pulses of one-half select current amplitude in a one-out-of-$n$ code representative of the factors to be compared to said cores, each factor of a particular value being coupled to a respective core, each said factor arranged to cause one core to which it is coupled to tend to shift to one stable state and the higher valued cores to shift to the opposite stable state, means for providing bilateral control current pulses to said cores, said control pulses being of variable amplitude and polarity in time dependence, said input current pulses and said control current pulses being combined to affect the state of said cores, and means for synchronizing the input current pulses to said cores and said control pulses for providing output pulses at time periods representative of the relative values of said factors.

5. A matrix for comparing two factors comprising, in combination, a plurality of bistable magnetic cores; each of said cores having a respective input line or winding; said input lines being arranged to each receive a particular value input in a one-out-of-$n$ code; each input line being wound through a respective core in a first direction to tend to drive said respective core to one stable state and through the cores receiving a relatively higher valued input in a second direction to tend to drive said cores to the opposite stable state; a first factor input being indicated to a core by a half-select read current flowing through its associated input line in a first direction during a first time period and a half-select write current flowing in the opposite direction during a second time period; a second factor being indicated to a core by a half-select read current flowing through its associated line during a third time period and a half-select write current during a fourth time period; a common control line and a common output sense line for said cores; said control line providing a read current to said cores during a first period, a zero current to said cores during a second period, a half-select write current to said cores during third and fourth periods, and a full select write current during a fifth period; whereby, if the first factor is of a higher value than the second factor an output will be provided during said third timing period, if the two factors are equal an output will be provided during said fourth timing period, and if the first factor is of a relatively lower value than said second factor an output will be provided during said fifth timing period.

6. A comparing matrix as in claim 5 and in which succeeding ones of said input lines are arranged to progressively receive higher valued inputs.

7. A matrix for comparing two sequentially received factors comprising, in combination, a plurality of bistable magnetic cores; input lines for receiving bilateral current pulses of one-half select current amplitude in a one-out-of-$n$ code representative of a factor to be compared; each of said input lines being energized to indicate receiving a factor of a respective value, a clock means for providing timing periods, said input lines arranged to be energized by a half-select current flowing in one direction during a first time period and a half-select current flowing in the opposite direction during a second time period, each said input line being wound in a first direction through a respective core to tend to shift the core toward one stable state in response to a current flow therethrough and being wound in an opposite direction through the cores receiving the higher valued factors inputs to tend to shift said higher valued cores toward the other stable state in response to the same current flow; a common control line and a common sense line wound through each of said cores; said control line being arranged to receive current pulses of a half-select amplitude during a first period to tend to set the cores to one stable state, no current pulses during a second time period, current pulses of a half-select amplitude during a third and a fourth period to tend to set the cores to an opposite stable state and a full select current pulse during a fifth period to set the cores to said opposite stable state; said clock means being effective to synchronize the factor inputs and said control current pulses to determine the timing period during which said output sensing circuits are activated; whereby, if the factor entered into the comparing matrix during one time period is of a higher value than a factor entered into the core matrix during a succeeding period an output will be obtained during a first clock time period if the two factors are of equal value an output will be obtained during a first clock time period, and if the second factor is of a lower value than the second an output will be obtained during a third clock time period.

References Cited in the file of this patent

UNITED STATES PATENTS

| | | |
|---|---|---|
| 2,922,996 | Young | Jan. 26, 1960 |
| 2,962,704 | Buser | Nov. 29, 1960 |